(12) United States Patent
Oran

(10) Patent No.: US 7,199,832 B2
(45) Date of Patent: Apr. 3, 2007

(54) PORTABLE PHOTOGRAPHIC DEVICE AND GRIP WITH INTEGRATED CONTROLS FOR SINGLE HANDED USE

(76) Inventor: Daniel Oran, 3516 Duff Dr., Falls Church, VA (US) 22041

( * ) Notice: Subject to any disclaimer, the term of this patent is extended or adjusted under 35 U.S.C. 154(b) by 250 days.

(21) Appl. No.: 10/954,486

(22) Filed: Oct. 1, 2004

(65) Prior Publication Data

US 2006/0072033 A1    Apr. 6, 2006

(51) Int. Cl.
*H04N 5/225* (2006.01)
(52) U.S. Cl. ........................ 348/376; 348/373
(58) Field of Classification Search ............... 348/373, 348/374, 376; 396/502, 503, 535, 540; 358/909.1, 358/906
See application file for complete search history.

(56) References Cited

U.S. PATENT DOCUMENTS

| | | | |
|---|---|---|---|
| 4,158,489 A | | 6/1979 | Gottschalk et al. |
| 4,329,041 A * | | 5/1982 | Madge et al. ............... 396/425 |
| 4,727,390 A | | 2/1988 | Brown |
| D345,738 S | | 4/1994 | Lee |
| 5,737,657 A | | 4/1998 | Paddock et al. |
| 6,188,432 B1 * | | 2/2001 | Ejima .................... 348/240.99 |
| 6,196,504 B1 | | 3/2001 | Lemke |
| 6,229,953 B1 * | | 5/2001 | Ejima et al. .................. 386/96 |
| 6,259,469 B1 * | | 7/2001 | Ejima et al. ............. 348/14.01 |
| 6,327,423 B1 * | | 12/2001 | Ejima et al. .................. 386/96 |
| 6,384,863 B1 * | | 5/2002 | Bronson ...................... 348/373 |
| 6,415,106 B2 * | | 7/2002 | Hayashi et al. ................ 396/85 |
| 6,459,857 B2 * | | 10/2002 | Kawamura et al. .......... 396/374 |
| 6,567,120 B1 * | | 5/2003 | Hamamura et al. ..... 348/207.99 |
| 6,567,618 B2 * | | 5/2003 | Kai et al. .................... 396/299 |
| 6,731,341 B1 | | 5/2004 | Uchiyama |
| 6,773,110 B1 * | | 8/2004 | Gale .......................... 352/243 |
| 6,956,616 B2 * | | 10/2005 | Jung et al. ................... 348/376 |
| 7,058,286 B2 * | | 6/2006 | Ejima et al. ................... 386/95 |
| 7,084,897 B2 * | | 8/2006 | Ejima et al. .............. 348/14.01 |
| 2001/0009607 A1 * | | 7/2001 | Ejima et al. ................... 386/96 |
| 2001/0012065 A1 * | | 8/2001 | Ejima et al. ................. 348/232 |
| 2001/0013897 A1 * | | 8/2001 | Kowno et al. .............. 348/240 |
| 2001/0014214 A1 * | | 8/2001 | Hayashi et al. ................ 396/85 |
| 2001/0017657 A1 * | | 8/2001 | Kowno et al. .............. 348/231 |
| 2001/0043278 A1 * | | 11/2001 | Hamamura ............. 348/333.01 |
| 2002/0003577 A1 * | | 1/2002 | Kitsugi et al. .............. 348/232 |
| 2002/0018134 A1 * | | 2/2002 | Tsukahara et al. ...... 348/333.01 |
| 2002/0085101 A1 * | | 7/2002 | Kowno et al. .............. 348/231 |
| 2002/0093578 A1 * | | 7/2002 | Kowno et al. .............. 348/241 |
| 2003/0016293 A1 * | | 1/2003 | Hamamura .............. 348/231.3 |

(Continued)

OTHER PUBLICATIONS

Harris, Fisher Pocket Cameracorder is the World's Lightest High-Resolution MPEG-4 Camcorder/Digital Camera, Nov. 17, 2003, available at www.lisherav.com/fvd-c1_pr.htm.

*Primary Examiner*—Ngoc-Yen Vu
*Assistant Examiner*—Nicholas G Giles

(57) ABSTRACT

An image-capturing device comprises a lens, flash and viewfinder attached along a central axis of symmetry to the top of a grip having recessed shutter triggers on opposing sides and rear thumb controlled means for adjusting the focus of the lens, powering and controlling the performance of the device. The center of gravity of the image capturing device is coincident with or proximate the grip. A detachable grip for use with a portable photographic device is also described. The detachable grip may be used with interchangeable lens components.

19 Claims, 5 Drawing Sheets

U.S. PATENT DOCUMENTS

| | | | |
|---|---|---|---|
| 2003/0103148 A1* | 6/2003 | Ejima et al. | 348/231.3 |
| 2003/0156217 A1* | 8/2003 | Ejima | 348/373 |
| 2004/0095506 A1* | 5/2004 | Scott | 348/373 |
| 2004/0096205 A1 | 5/2004 | Kato et al. | |
| 2006/0061671 A1* | 3/2006 | Kitsugi et al. | 348/231.99 |
| 2006/0133798 A1* | 6/2006 | Palmer et al. | 396/427 |

* cited by examiner

PORTABLE PHOTOGRAPHIC DEVICE AND GRIP WITH INTEGRATED CONTROLS FOR SINGLE HANDED USE

FIELD

The present invention relates generally to portable photographic devices, and more specifically to a photographic device with an ergonomic grip with integrated controls.

BACKGROUND AND RELATED ART

The term "photographic device" will be used interchangeably with the term "image capturing device" throughout this disclosure. Portable photographic devices include digital and film still picture cameras, camcorders, digital and tape video recorders, motion picture cameras and the like. For convenience, the term "camera" will be used to refer to still picture cameras and the like and "camcorder" will be used to refer to moving picture cameras and the like. As will be obvious to one skilled in the art, modern technology can blur the distinction between still and moving picture cameras, as seen for example with the CAMERACORDER™ photographic device available from Fisher Multimedia.

In all cases, portable photographic devices must be comfortable and convenient for optimum usefulness. Comfort and convenience are largely determined by weight distribution, the manner in which the device must be held during use, and the location and accessibility of control and viewing elements. It is desirable that the weight of the device be distributed so the center of gravity is substantially coincident with the user's grip to avoid torque upon the user's hand for maximum ease of use. It is further desirable that holding and operating the device with only one hand, and preferably by either the left or right hand, be convenient and practical, to encourage use by the entire photography market. It is further desirable that the device be conveniently usable without raising the upper arm, shoulder or elbow above a comfortable natural position to facilitate use by those with limited strength and flexibility, such as the elderly and disabled. It is further desirable that the device have a strong vertical axis, making it simple to align to ensure pictures may be taken square to the horizon if needed, even by those with limited hand-eye coordination. It is further desirable that the controls be manipulable with one hand while the user views the intended picture, to avoid impairing the intended picture while adjusting the focus or using other controls.

Typically, portable photographic devices, particularly cameras, are substantially rectangular in shape and are held with one of the widest sides toward the user. See for example, U.S. Pat. No. 6,731,341. The rectangular shape dictates that the device be held to one side of the user's face at approximately eye level for best picture shooting conditions. This requires that the user's upper arm, shoulder and elbow be raised above a natural position. This may be difficult, painful or impossible for users with impaired mobility. In addition, traditional rectangular cameras are best held with both hands on either side of the center of gravity to stabilize the entire camera, requiring both hands to be raised.

As technology has improved, manufacturers have miniaturized rectangular photographic devices to make one-handed holds easier. However, one handed holds for smaller cameras still require the user to raise his arm above the natural position, and create additional ease of use problems. A very small camera may be easily held by one hand, but access to the controls without obscuring the lens and while viewing the scene is difficult, particularly for users with limited dexterity.

Even very small devices may still create torque around the center of gravity further inhibiting comfortable use. One solution, described in U.S. Patent Application 20040096205, is to reorient the device so that the long, narrow side of the rectangular box faces the user. The lens and view screen are then flipped out from the main camera body, requiring addition steps to set up the camera for picture taking, impairing convenience. Furthermore, users with impaired near vision will need to hold the camera away from the body in order to view the display screen and the scene of view, because a view finder is not provided.

In addition, one hand holds on rectangular photographic devices require that the device be configured for either right or left handed users, by placing the grip, shutter release and major controls on one side of the device. U.S. Pat. No. 6,731,341 discloses an electronic camera with a grip unit that may be manufactured on either the right or left side of a body middle portion; however, this still requires the manufacture of different cameras for right and left handed users.

Camcorders are often configured in a "gun" shape, with the bulk of the device extending away from the user's face and toward the scene being photographed, or in a rectangular shape similar to cameras. The "gun" configuration creates a device with a center of gravity in front of the grip, away from the user, creating torque pulling the device down and away from the desired position. Even though the grip is located below the device, the torque makes long-term holds uncomfortable, particularly for users with limited hand and wrist strength. The miniaturized "gun" shape, as adopted by the CAMERACORDER™ photographic device is not symmetric for use by either hand. In addition, the CAMERACORDER™ photographic device requires the use of a docking station and does not provide a view finder.

Even when a photographic device is configured to be held by either hand for using a telephoto lens or shooting in low light conditions, the location and operation of the shutter release, focus and other camera controls require both hands, difficult and precise fingering, and raised hands to about eye level. For example, U.S. Pat. No. 4,727,390 discloses a camera-mounting bracket that may be gripped with either hand, but requires both hands to steady the camera and focus or operate camera controls at the same time.

SUMMARY

An image-capturing device comprises a lens, flash and viewfinder attached along a central axis to the top of a grip having recessed shutter triggers on opposing sides and rear thumb controlled means for adjusting the focus of the lens, powering and controlling the performance of the device. The center of gravity of the image capturing device is coincident with or proximate the grip. A detachable grip for use with a portable photographic device is also described. The detachable grip may be used with interchangeable lens components.

DETAILED DESCRIPTION OF THE DRAWINGS

The drawings show portable photographic devices with an ergonomic grip with integrated controls, which are embodiments of the invention herein described. Additional embodiments, such as a conventional film camera, are contemplated. One skilled in the art would know that some of the components shown may not be required in all embodiments, such as the download ports and digital view screen. In the case of a conventional film camera, the removable storage medium would comprise film, a film cartridge or the like. In cases where motion picture recording is desired, the device may be provided with microphones and speakers, or the like, to enable integrated sound and video recording and playback. Sensors, such as an infrared rangefinder, may be added as needed to any embodiment. A preferred sensor location is proximate the viewfinder and lens.

Figure 1:
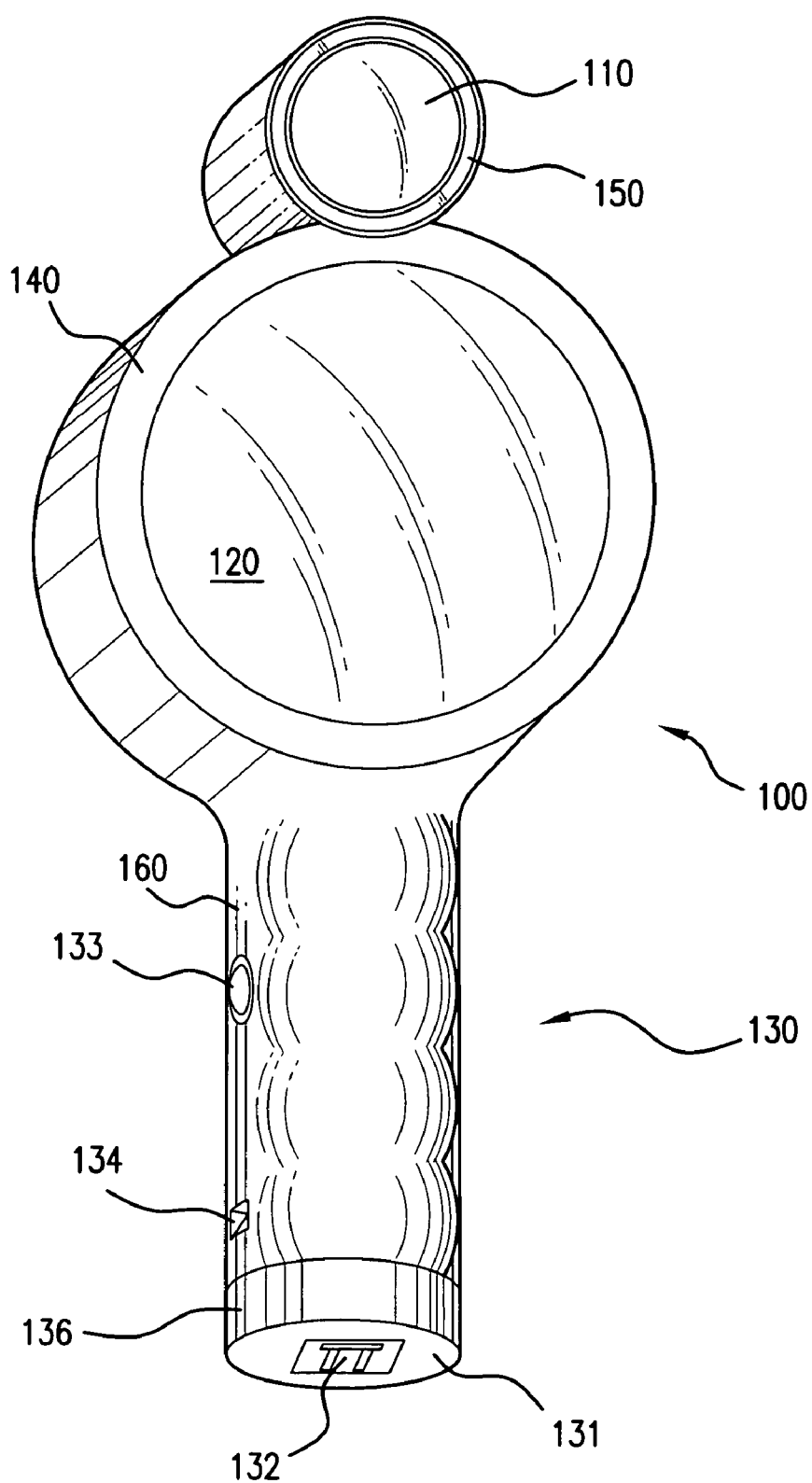
FIG. 1 is a perspective view of the front of a first embodiment.

FIG. 1 shows the front of a photographic device with an integrated grip 100 having a view finder or viewing lens 110 within a flash ring 150, positioned above and on a centralized axis of symmetry with a lens 120 encased within a body housing 140 and a soft molded grip 130, positioned below the lens 120 on the same axis as the viewing lens 110. The device has two degrees of symmetry around the central vertical axis, allowing for equal ease of use by either hand and ease of vertical alignment. The lens may be protected with a traditional shutter, lens cap or the like when not in use.

The front of the grip is molded so that a user's fingers will fit comfortably and stably around the grip 130. The bottom of the grip 131 is provided with an end cap 136, having a recharging plug 132. The end cap 136 may be hinged to allow for access to the interior of the grip while maintaining an electrical connection and latched for secure closure. The left and right sides 160, 161 of the grip 130 are provided with a recessed shutter trigger 133, for ease of use by either index finger. The left side 160 of the grip 130 is provided with a download port 134 for downloading the memory of the camera 100. As is clear the download port 134 may alternatively be provided in any other convenient location. The download port 134 may be a USB port or the like to allow both downloading memory to an output device, such as a computer or television, and an alternate means to power the device 100.

Figure 2:
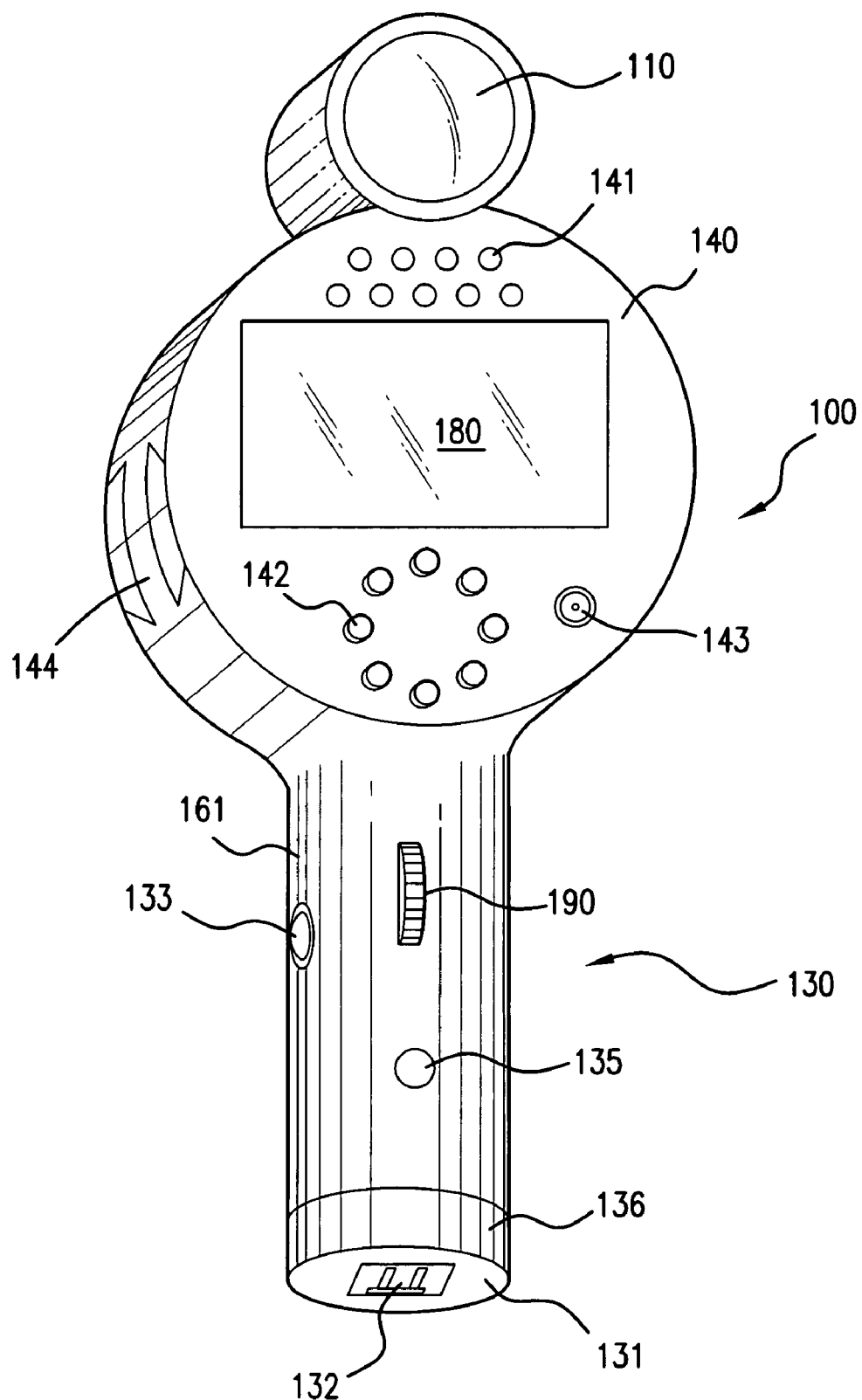
FIG. 2 is a perspective view of the back of a first embodiment.

FIG. 2 shows the back of the device 100 shown in FIG. 1. The recessed power button 135 is positioned on a lower rear portion of the grip 130, accessible by the user's thumb. A thumb control 190 is positioned on an upper rear portion of the grip 130 in order to allow the use of a thumb to adjust the focus of the lens 120. The thumb control 190 may be a concave or convex roller or continuously variable control of like capabilities. A second download port 143 is provided on a lower rear portion of the body housing 140 for maximum download flexibility.

A view screen 180 is provided in a central portion of the back of the body housing 140. The view screen 180 may be provided with an optional slightly raised protective rim and may be protected with an optional sliding shutter. The view screen 180 may be a liquid crystal display or the like. Indicator lights 141 are provided on the upper rear portion of the body housing 140 for optimum clarity while the device 100 is in use. Indicator lights 141 may show the mode in which the device is operating, power level or the like. Setting and screen control buttons 142 are positioned on the lower rear portion of the back of the body housing 140. Buttons 142 may include buttons for switching between a camera mode, a video mode and a memory mode, paging through stored images, flash controls and the like.

Optionally, the side of the body housing 140 may be provided with hinged stabilizing legs 144 that may be folded out as braces when the camera is not in use. Stabilizing legs 144 may be locked flat against the side of the body housing 140 when not in use or flipped out and locked at an approximately 45 degree angle extending out past the front and back of the body housing 140 for maximum stability.

Figure 3:
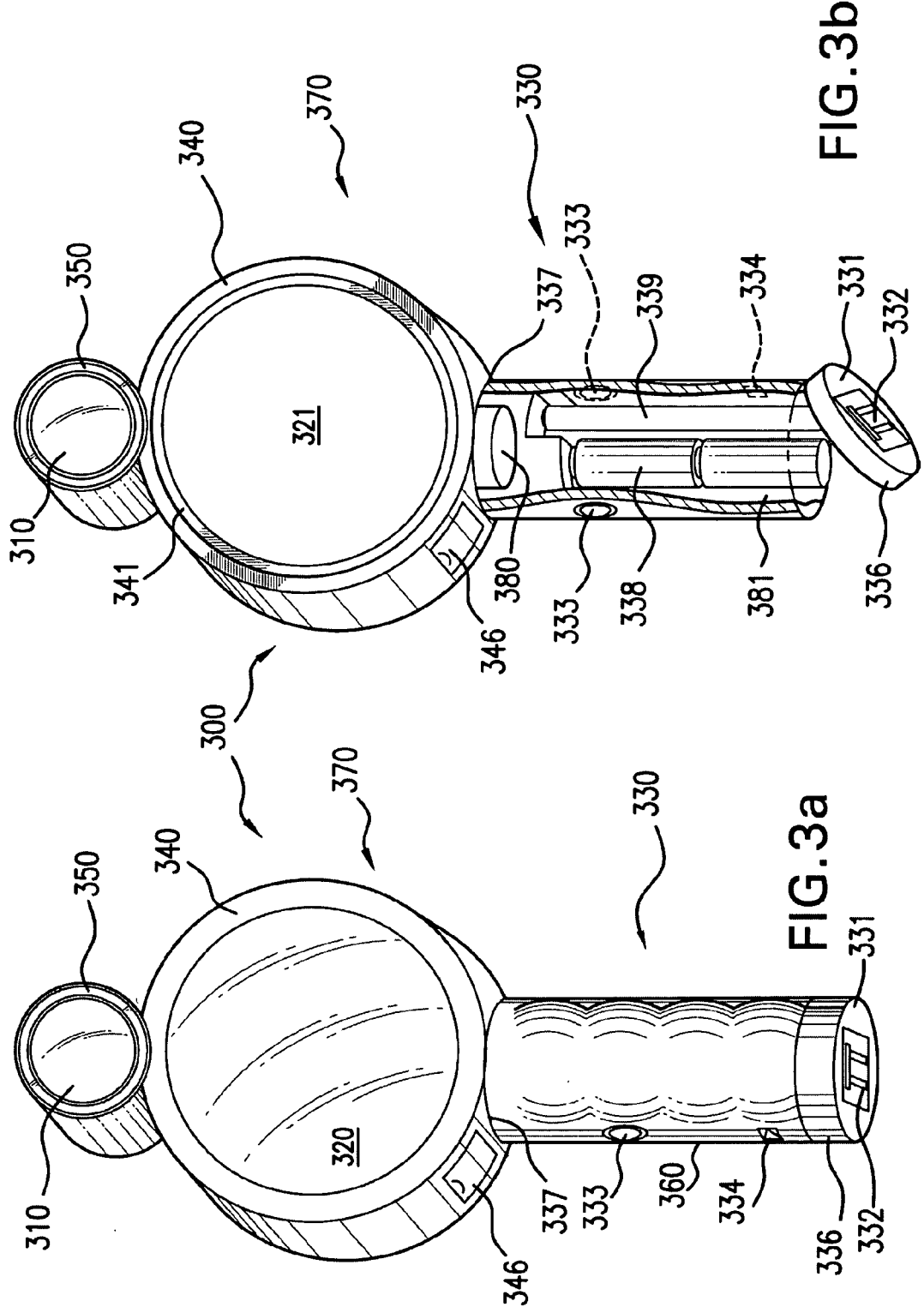
FIG. 3a is a view of the front of a second embodiment.
FIG. 3b is a cut away view of the second embodiment.

FIG. 3a shows a front view of a second embodiment of the invention 300, a grip 330 with a detachable and interchangeable lens component 370. The lens component or lens module 370 comprises a lens 320 encased within a housing 340 and a viewing lens 310 within a flash ring positioned above and on a centralized axis of symmetry with the lens 320. The lens component 370 is further provided with a female attachment member (not shown) for connection with the soft, molded camera grip 330 at the attachment point 337 located at the top of the grip 330. When the lens component 370 is not in use with the grip a sliding shutter 346 may be slid over the female attachment member to protect it from dust and dirt. The lens component 370 may be downloaded to a computer while the grip 330 is recharged via the recharging plug 332 or used with an alternate lens component.

The grip 330 is provided with a corresponding attachment member at its top for connection to the interchangeable lens component 370 at the attachment point 337. The grip 330 has a bottom surface 331 opposite the attachment member. A recharging plug 332 is recessed within the bottom surface 331 of the grip 330. Both sides 360 of the grip 330 are flat and provided with a recessed shutter trigger 333 on a middle portion. At least one side 360 is provided with a download port 334 on a lower portion of the side of the grip so as not to interfere with a user's hand. The flat sides 360 of the grip 330 are continuously and smoothly connected to the soft molded front and back portions of the grip for a smooth hand-feel.

FIG. 3b is a cutaway view of the second embodiment showing internal components of the camera 300. The body housing 340 is provided with a mounting portion 341 for the lens 320. An image-capturing element 321 is positioned behind the lens 320. The entire image recording and reproducing mechanism is not shown, but may be located behind the image-capturing element 321. At the attachment point 337, socket joint unit 380 provides for physical and electrical connectivity between the lens component 370 and the grip 330. An interior cavity 381 of the grip 330 houses a battery 338 and a removable storage medium 339. The battery 338 may comprise standard AA batteries, rechargeable batteries, a battery pack or any other power supply. The interior cavity 381 is accessed via the end cap 336. The end cap 336 includes the recharging plug 332 for recharging the batteries 338. The download port 334 is connected to the removable storage medium 339, for downloading pictures from the camera 300.

Figure 4:
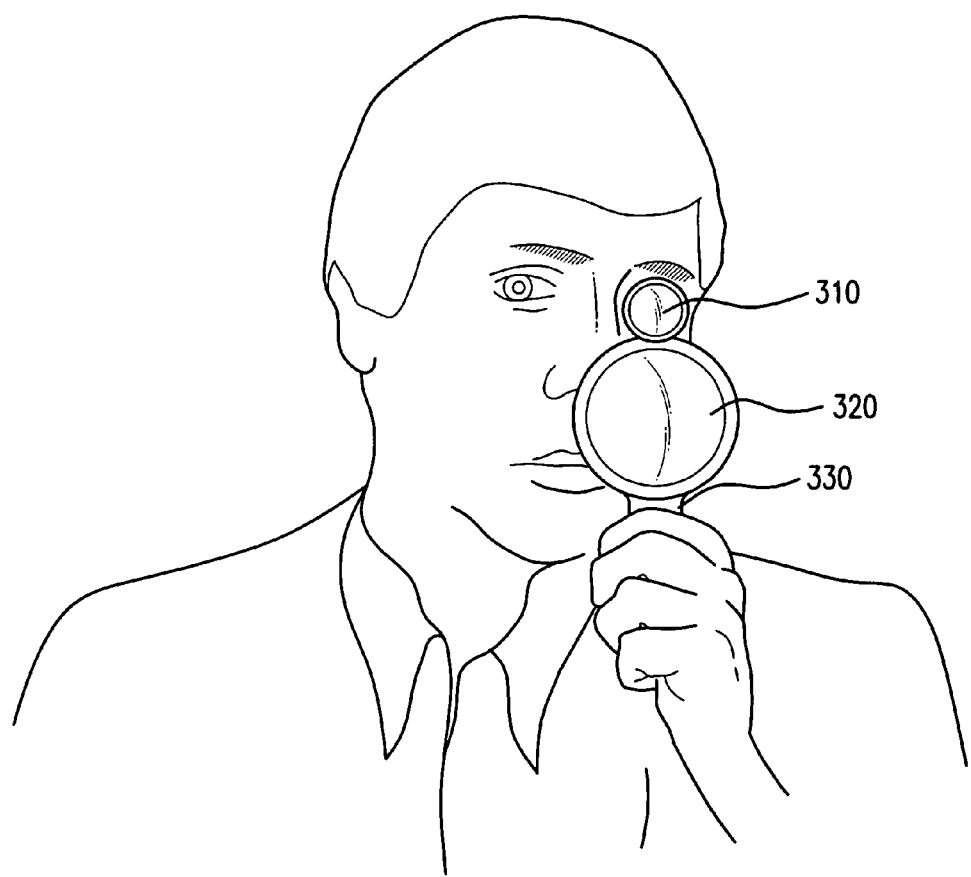
FIG. 4 is a view of the second embodiment in use by a right-handed user.

FIG. 4 shows the camera 300 in use by a left-handed user. The user holds the camera 300 with his left hand wrapped around the grip 330 so that the left index finger rests near the right shutter release button 333. As is clear from FIG. 4, a right-handed user could hold the camera 300 with her right hand so that the right index finger rests near the left shutter release button 333. The camera is held so that the viewing lens 310 is in front of the eye.

The user may use either eye with equal ease. The option to use either eye is particularly helpful for left-handed persons, persons with an impaired hand or eye, and persons wearing a pair of contact lenses, one of which is adjusted for near vision and the other for far vision. One hand only is raised a short distance to an area slightly below and slightly to the side of the chin while the shoulder and elbow remain relaxed in their natural positions. The other hand and arm are required for neither camera support nor operation of the controls. The majority of the weight of the camera is either within the grip or centered directly above it, which optimizes the center of gravity of the device for balance when using the one-handed grip. The device is designed with a center of gravity substantially coincident with the grip. For extremely slow shutter speeds or long term holds, the elbow of the arm holding the camera may be supported by the opposite hand while the opposite arm rests against the body for support. Even in this case, neither arm is raised above its normal relaxed position.

Figure 5B:
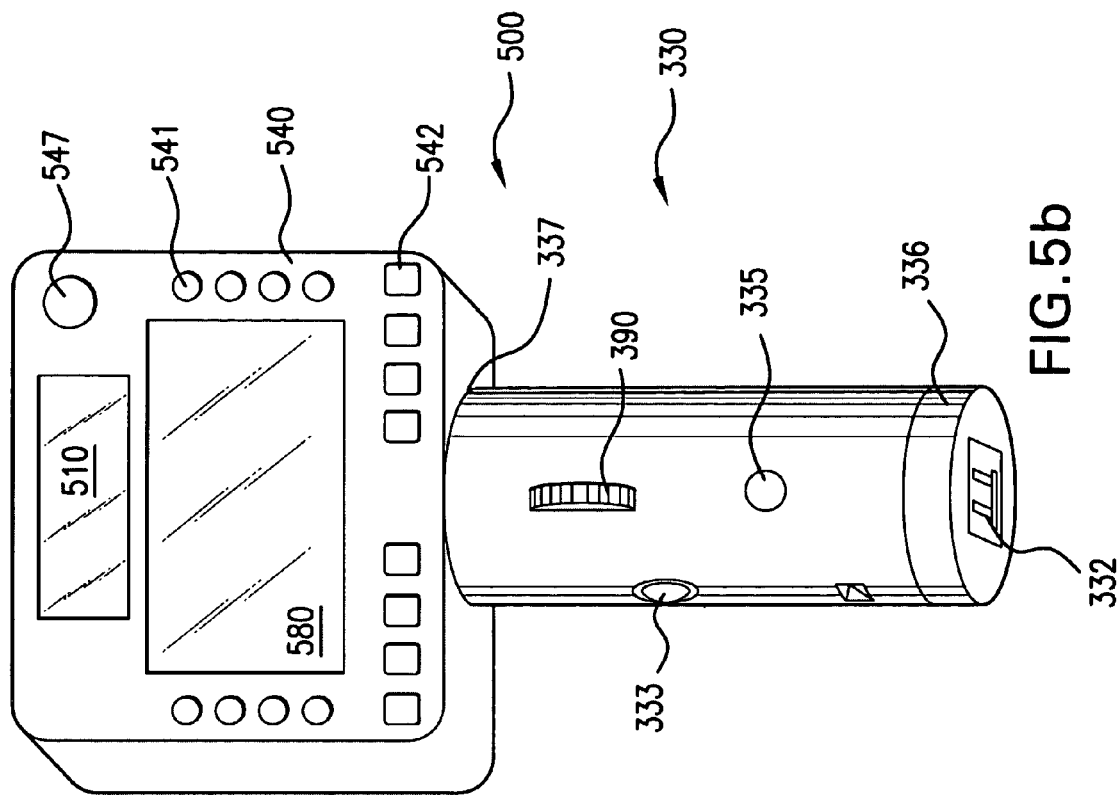
FIG. 5b is a back view of the third embodiment.
Figure 5A:
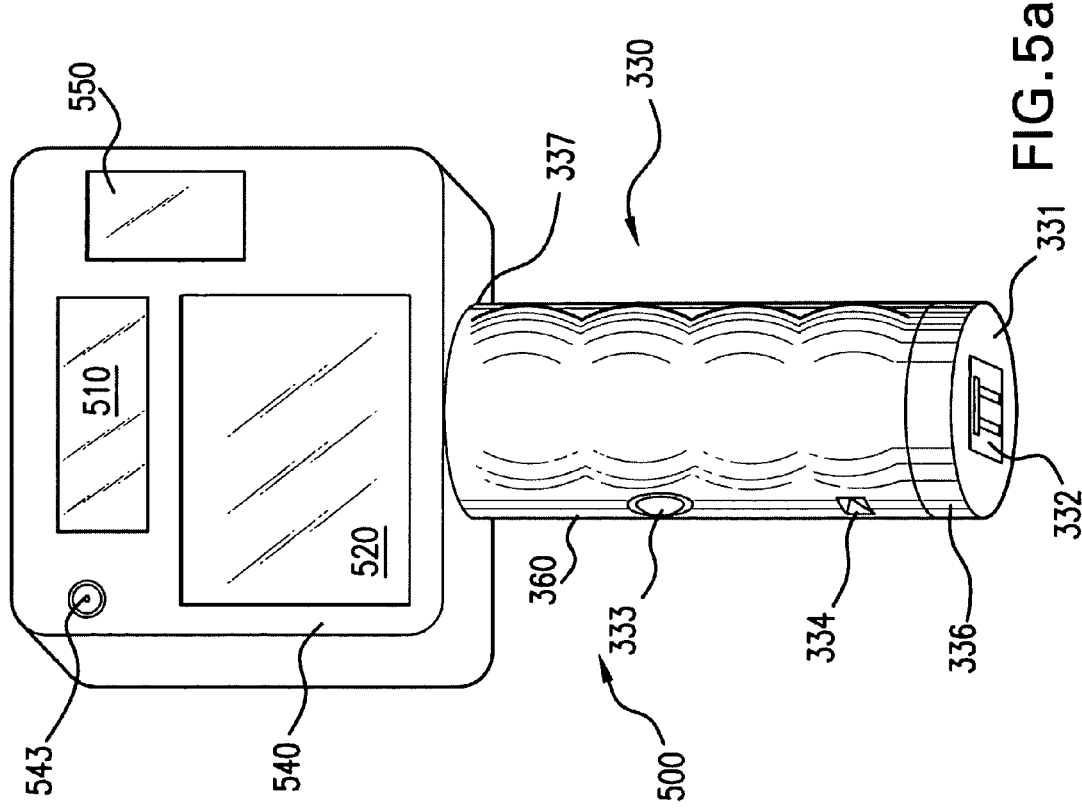
FIG. 5a is a front view of a third embodiment.

FIG. 5a shows the front of a camera 500 with the detachable grip 330 below a substantially rectangular main body 540. The front of the main body 540 is provided with a viewing lens 510, a lens 521, download port 543 and flash 550 arranged in a convenient manner.

FIG. 5b shows the back of the camera 500. A view screen 580 is provided in a central portion of the back of the main body 540. The view screen 580 may be provided with a slightly raised protective rim or shutter if desired. Indicator lights 541 are provided on either side of the view screen 580 and correspond to the setting buttons 542 positioned below the view screen and slightly to either side of the central axis. A larger power indicator light 547 is also proved on the rear of the main body 540.

The largest embodiment of the photographic device, according to the embodiment shown in FIG. 1, is envisioned to be between approximately six and approximately eight inches in length. An embodiment of the device according to FIG. 5 is envisioned to be between approximately four and approximately six inches in length. One embodiment is preferably approximately five inches in length.

Smaller embodiments may be carried in a pocket or small purse. Larger embodiments may be comfortably carried in a jacket pocket or large purse. Additional carrying means may be provided integral to the camera. Such carrying means for attaching a cord for wearing around the wrist or neck include a small circular eyelet attached transversely on top of the eyepiece module, left and right eyelets attached to the upper sides of the lens module, or small holes from front to back at approximately the "10 & 2 o'clock" positions of the lens module. A cord may also be pressure-cinched around the narrow area between eyepiece and lens portions of the body housing for wearing around the neck.

The camera may also be carried in a holster. The holster may be provided with a belt clip. Attachment points, such as eyelets or D-rings on either side of the lens component, may also be provided for use with a lanyard, so the holster may be worn as if on a necklace. The holster is constructed of a soft or semi-hard long wearing material suitable for outdoor-use, such as nylon, leather, or the like. The holster has a top closure flap. The closure flap opens completely for insertion of the camera into the holster and may be fastened to the main holster body at the attachment point using a hook and eye fastener or the like. The grip of the camera slides through a hole in the bottom of the holster.

The embodiments described above are for purposes of illustration only and various modifications of these embodiments are considered to be within the scope of the teachings of this invention, which is to be limited only by the claims appended hereto.

I claim:

1. A portable photographic device, comprising:
   a view finder;
   a lens, wherein said view finder and lens are encased by a body housing, forming a lens module having a front face and a rear face and a vertical axis centered therebetween; and
   a grip integrally attached to a bottom portion of said body housing along the vertical axis and in electrical communication with said lens module; wherein the grip has a front grip face and a rear grip face, and opposing sides; a shutter trigger on each of the opposing sides; and a means for adjusting the focus of the lens with a thumb on the rear grip face.

2. The device of claim 1, further comprising a flash on the front face of the body housing.

3. The device of claim 2, wherein the view finder and lens are substantially circular; the view finder is located above the lens along the vertical axis; and the flash is substantially ring-shaped and surrounds the front of the view finder.

4. The device of claim 3, wherein the lens module is substantially shaped as a small circle above a larger circle.

5. The device of claim 2, further comprising a pair of legs hingedly attached to a side of the body housing.

6. The device of claim 2, wherein the view finder, flash and lens are substantially rectangular, and the lens module is substantially rectangular.

7. The device of claim 2, further comprising a view screen on the rear face of the body housing.

8. The device of claim 1, wherein the grip has a cap on an end opposite the lens module to provide access to an interior of the grip.

9. The device of claim 8, further comprising a removable battery and a removable storage medium in the interior of the grip.

10. The device of claim 1, wherein the grip further comprises an end cap on a lower end for access to a central cavity of the grip.

11. The device of claim 1, wherein the grip further comprises a download port located on one of said opposing sides for downloading a memory of the device.

12. The device of claim 1, wherein a lower end of said grip is provided with a recharging plug.

13. The device of claim 1, wherein said rear grip face is further provided with a power button located so as to be operable by thumb.

14. The device of claim 1, wherein said front grip face is provided with finger contours construsted from soft molded material.

15. An image capturing device, attachable to an upper end of a one-handed grip, the one-handed grip comprising:
   an upper end for electrically and physically attaching to the image capturing device;
   a lower end;
   a front grip face;
   a rear grip face having a thumb controlled focus adjusting means; and opposing sides, each having a shutter trigger; the image capturing device further comprising:

a view finder;

a front face having a lens substantially larger than the view finder and centered below the view finder along a central axis of the device;

a rear face having a view screen located below the view finder; and a plurality of control buttons located below the view screen on a lower portion of the rear face.

16. The image capturing device of claim 15, wherein said view finder and said lens are substantially circular.

17. The image capturing device of claim 16, further comprising:

a substantially ring-shaped flash surrounding the view finder on the front face;

a plurality of indicator lights located above the view screen and below the view finder; and an alternate download port for downloading a memory of the device.

18. The image capturing device of claim 17, wherein a housing of the device substantially conforms to the shape of the view finder and lens and a lower portion of the housing is provided with an attachment member along the central axis of the device; said attachment member providing electrical and physical connectivity.

19. The image capturing device of claim 18, wherein the housing is provided with a means for protecting the attachment member when said attachment member is not in use.

* * * * *